US012767742B2

(12) United States Patent
Grad

(10) Patent No.: US 12,767,742 B2
(45) Date of Patent: Oct. 20, 2026

(54) RECYCLED MATERIAL PLAY YARDS AND GATES

(71) Applicant: North States Industries, Inc., Plymouth, MN (US)

(72) Inventor: Julie Yager Grad, Wayzata, MN (US)

(73) Assignee: North States Industries, Inc., Plymouth, MN (US)

( * ) Notice: Subject to any disclaimer, the term of this patent is extended or adjusted under 35 U.S.C. 154(b) by 253 days.

(21) Appl. No.: 18/444,806

(22) Filed: Feb. 19, 2024

(65) Prior Publication Data

US 2024/0317910 A1 Sep. 26, 2024

Related U.S. Application Data

(60) Provisional application No. 63/491,794, filed on Mar. 23, 2023.

(51) Int. Cl.

| | |
|---|---|
| ***C08F 210/06*** | (2006.01) |
| ***A47D 13/06*** | (2006.01) |
| ***E04H 17/16*** | (2006.01) |
| ***E04H 17/18*** | (2006.01) |

(52) U.S. Cl.

CPC .......... *C08F 210/06* (2013.01); *A47D 13/065* (2013.01); *E04H 17/1602* (2021.01); *E04H 17/185* (2021.01)

(58) Field of Classification Search

CPC .... A47D 13/06; A47D 13/065; A47D 13/066; B29C 45/00; B29C 45/0001; C08F 210/006; C08F 210/06; C08L 23/10; C08L 23/12; C08L 23/14; C08L 23/142; C08L 23/145; C08L 23/147; C08L 2207/20; E04H 17/16; E04H 17/1602; E04H 17/168; E04H 17/17; E04H 17/18; E04H 17/185

See application file for complete search history.

(56) References Cited

U.S. PATENT DOCUMENTS

| | | | | |
|---|---|---|---|---|
| 9,615,672 | B2 | 4/2017 | Weisbeck et al. | |
| 11,523,692 | B2 | 12/2022 | Grad et al. | |
| 2011/0190447 | A1* | 8/2011 | Li | C08L 23/12 264/328.14 |
| 2014/0061563 | A1* | 3/2014 | Weisbeck | A47D 13/066 256/25 |
| 2023/0383109 | A1* | 11/2023 | Cavalieri | C08K 3/36 |

OTHER PUBLICATIONS

Olmsted et al., "Practical Injection Molding", 2001, Marcel Dekker, pp. 1-7 (Year: 2001).*

* cited by examiner

*Primary Examiner* — Zachary M Davis

(74) *Attorney, Agent, or Firm* — Merchant & Gould P.C.

(57) ABSTRACT

A play yard or a gate, and method of manufacturing the same, in which at least a portion of the play yard or the gate is constructed of a recycled plastic material. The play yard or gate can be construed using a recycled plastic resin that includes recycled copolymer polypropylene resin having one or more mechanical and/or other properties.

18 Claims, 5 Drawing Sheets

RECYCLED MATERIAL PLAY YARDS AND GATES

BACKGROUND

Play yards and gates are used to provide safe spaces for animals and/or children to play and/or perform other activities. Materials used to construct play yards and gates must therefore be suitably strong and reliable.

SUMMARY

In one aspect, the present disclosure is directed to a play yard or a gate in which at least a portion of the play yard or the gate is constructed of a recycled plastic material.

In another aspect, the present disclosure is directed to manufacturing a play yard or a gate using recycled plastic material.

DETAILED DESCRIPTION

A play yard forms an enclosed space in which young children and/or animals (e.g., pets) can be placed for security and safety. A typical play yard is made up of several panels and can be self-supporting. In some instances, the panels themselves form an enclosure. In some instances, the panels are mounted to another structure, e.g., a wall of a room, to form an enclosure.

Play yards can include gates that open and close to allow people and/or animals to selectively access or leave the enclosed space of the play yard.

Gates, such as pressure mounted gates, can also be used independently of play yards to allow people and/or animals to selectively access an enclosed space, such as a room by, for instance, placing and mounting the gate at the entry point (e.g., the doorway) to the enclosed space.

Figure 1:
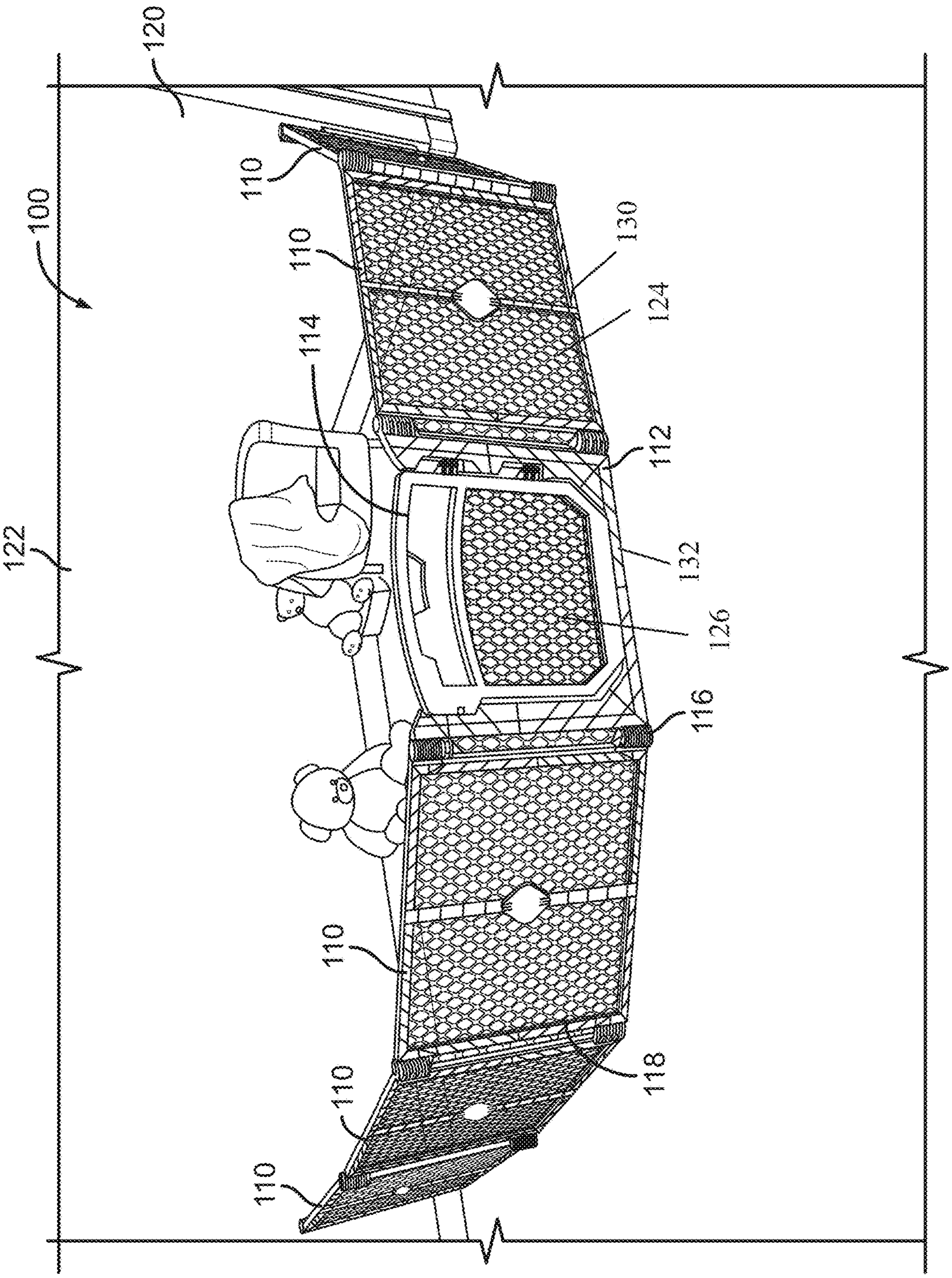
FIG. 1 shows an example play yard.

Referring to FIG. 1, an example play yard 100 is shown. In this example, the play yard 100 includes a plurality of panels that form an enclosed spaced with one or more walls of a room. In particular, the play yard 100 is coupled to one or more structures, such as walls 120, 122. In alternative embodiments, both ends of the play yard 100 can be coupled to the same wall.

All but one of the panels in this example are identical and are referred to herein as side panels 110. There are five side panels 110 in the play yard 100, although more or fewer side panels can be provided. The side panels 110 are connected by hinges 116 and rods 118 to form five of the six sides of the play yard 100.

The other panel is similar to the side panels 110, except the other panel includes a gate 114 and is referred to herein as a gate panel 112. The gate panel 112 connects to the other side panels 110 in a similar fashion. The gate 114 of the gate panel 112 pivots between a closed position and an open position. In other embodiments, the play yard may not need a gate panel. In still other embodiments, only a gate panel is provided and mounted directly to a structure, such as the doorposts at an entry to a room. Additional details regarding the gate panel 112 can be found in U.S. Pat. No. 9,615,672, which is hereby incorporated by reference.

Figure 2:
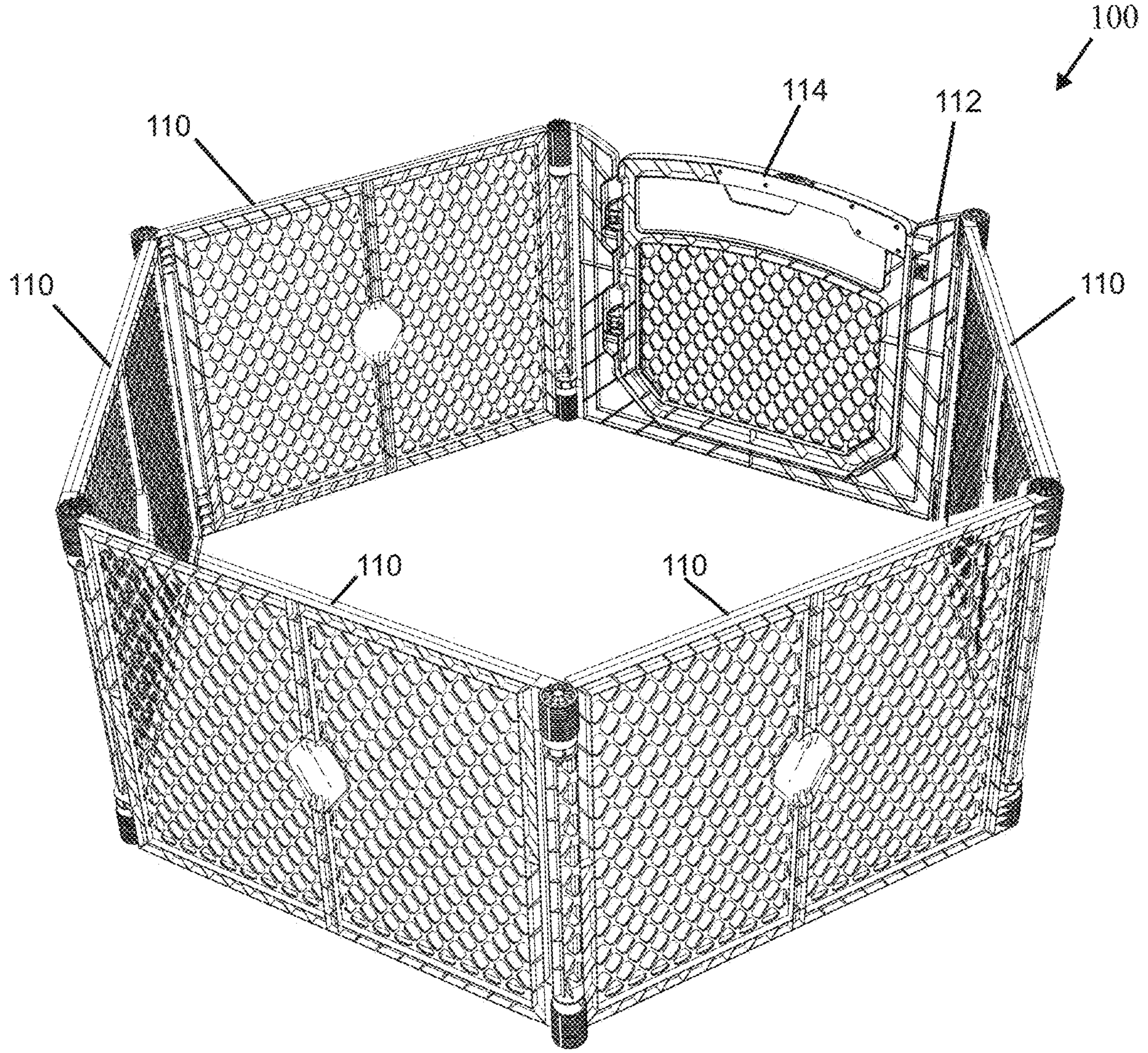
FIG. 2 shows another view of the play yard of FIG. 1 in a freestanding configuration.

In some examples, as shown in FIG. 2, the play yard 100 constructed of side panels 110 and, optionally, a gate panel 112, can form a free-standing play yard.

In FIG. 1, the panels 110, 112 and the walls 120, 122 together form an enclosed space into which a child and/or animal can be placed for security and safety. In other examples, the panels 110, 112 and the walls 120, 122 together from an enclosed space to exclude the child or animal, such as to keep the child or animal from a dangerous condition like a fireplace or stairway. The shape of the space in FIG. 1 can be varied by moving the panels 110, 112. In other examples, other numbers of panels and sizes/shapes of the enclosed space can be used.

In FIG. 2, the panels 110, 112 are freestanding and form an enclosed space into which a child and/or animal can be placed for security and safety. In other examples, the panels 110, 112 from an enclosed space to exclude the child or animal, such as to keep the child or animal from a dangerous condition. The shape of the space in FIG. 2 can be varied by moving the panels 110, 112. In other examples, other numbers of panels and sizes and/or shapes of the enclosed space can be used.

Referring to FIGS. 1 and 2, the gate panel 112 can be used to access the enclosed space by opening the gate 114 to gain access into and out of the enclosed space formed by the panels 110, 112.

Figure 4:
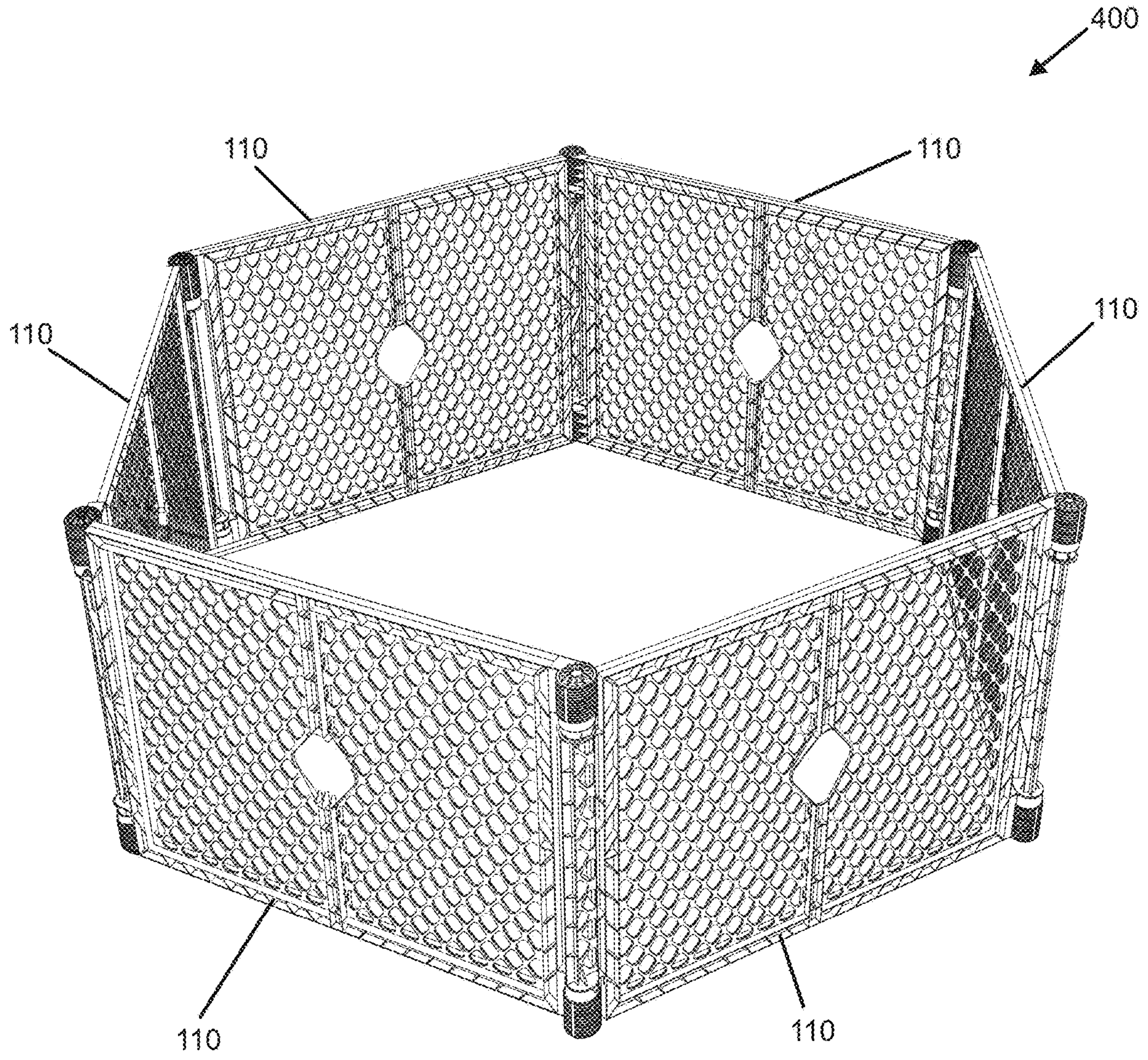
FIG. 4 shows another example play yard in a freestanding configuration.

FIG. 4 shows another example play yard 400 in a freestanding configuration. The play yard 400 includes six of the panels 110 defining an enclosed space without a gate panel.

In FIGS. 1 and 2, the gate panel 112 is configured to mount to two other panels 110 of a play yard. In other examples, a gate can be configured differently. For example, a gate, rather than being incorporated into a play yard, can instead be configured as a pressure mounted gate that mounts to a doorframe or between other fixed structures, such as a wall or a vertical post of a stairway railing or banister.

Figure 5:
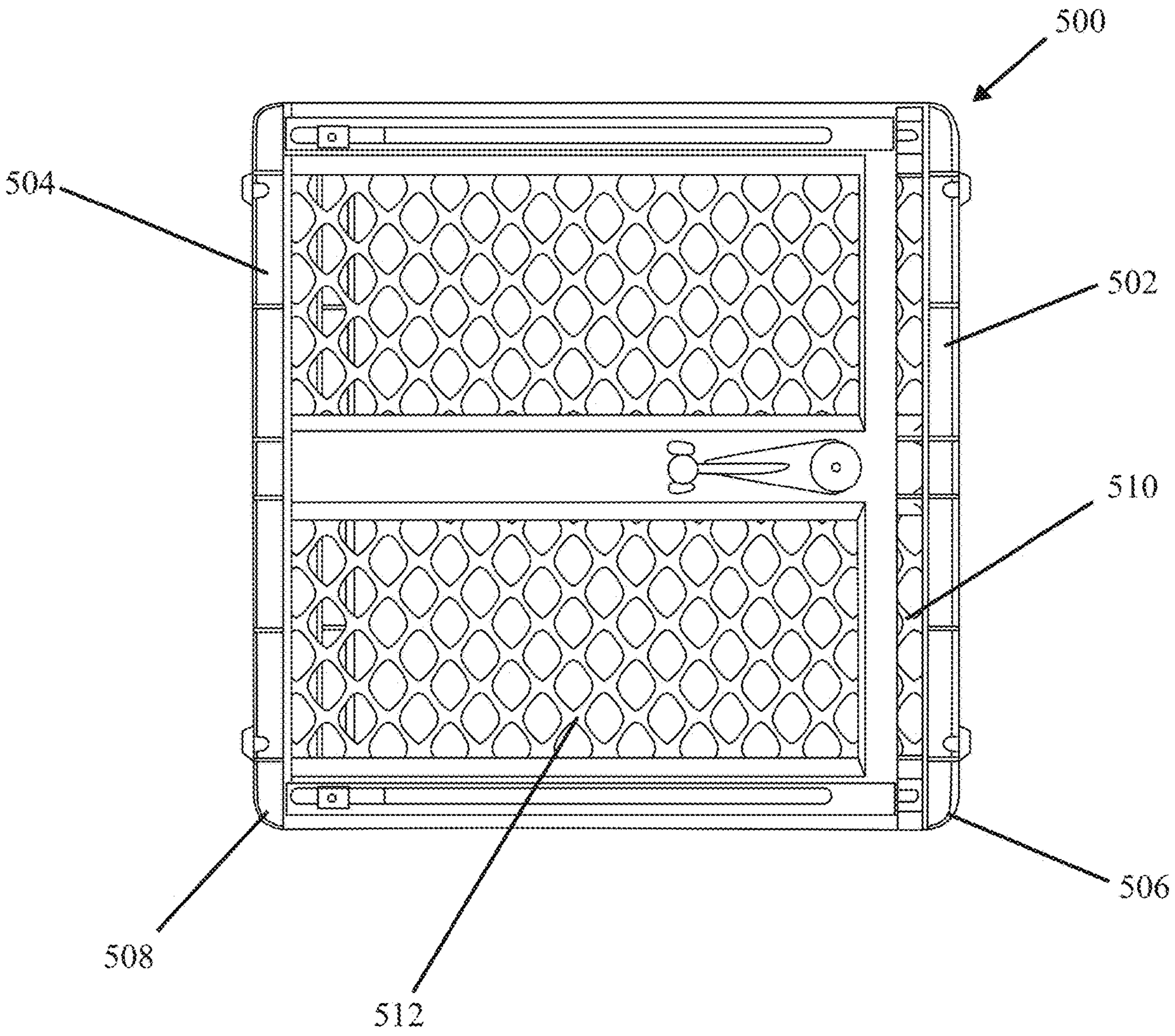
FIG. 5 shows an example gate.

An example of such a gate is the gate 500 shown in FIG. 5. The gate 500 includes two panels 502 and 504 that are slidably coupled to each other. Each panel 502, 504 includes a frame 506, 508, respectively, that surrounds a mesh or lattice 510, 512. The outer sides of the panels 502, 504 are configured to pressure mount to a structure, such as posts of a doorway, a wall, a post of a stairway railing, etc. To open the gate 500, the panels are unlocked from each other, and one of the panels is slid with respect to the other panel to create an opening.

As described herein, play yards and gates can be important to child and/or animal safety. It is important that the material used to manufacture the components of play yards is strong, durable, and lightweight. There can be deficiencies in strength and durability of recycled plastic. At the same time, for environmental and cost saving reasons, it is desirable to avoid using new materials, and to use recycled materials instead. The present disclosure advantageously provides a play yard that meets predefined strength and durability requirements for play yards, while having at least a portion of the play yard manufactured using recycled plastic.

One or more portions of the play yard 100, 400 or a gate 500 can be made of a non-recycled material, such as new plastic, new wood, or new metal.

In accordance with the present disclosure, at least a portion of the play yard 100, 400 or a gate 500 is made from recycled plastic. For example, the hinges 116 and rods 118 can be made of metal, the outer frame 130, 132 of a panel 110, 112 can be made of wood, and the mesh 124, 126 or other supports (e.g., one or vertical and/or horizontal cross-bars) within the frame 130, 132 can be made from recycled plastic.

In other examples, one or more different portions of the play yard 100, 400 are made from recycled plastic.

In other examples, the entirety of the play yard 100, 400 or the entirety of a given panel 110, 112 thereof, is made from recycled plastic.

In some examples, the entirety of a gate 500 is made from recycled plastic.

In some examples, one or more portions of the gate 500 is made from recycled plastic, such as a frame 506, 508 of a panel and/or mesh 510, 512 of a panel, while other portions of the gate 500 are not made of recycled plastic.

In some examples, the portion or portions of the play yard or gate made from recycled plastic include one or more other materials blended with the recycled plastic. For example, the recycled plastic could be blended with non-recycled plastic to form one or more portions of the play yard 100, 400 or of the gate 500.

As used herein, recycled plastic refers to a plastic that was fully formed and molded, and later broken down into a resin, which resin is used to construct one or more portions of the play yard or gate, such as the play yard 100, 400, or the gate 500. In some examples, recycled plastic includes post-consumer plastic.

In some examples, the recycled material used to make at least a portion of a play yard or a gate is a recycled thermoplastic resin.

In some examples, the recycled material used to make at least a portion of a play yard or a gate is a recycled copolymer polypropylene resin (CPR).

In some examples, the CPR can have one or more of the following properties: a melt flow of approximately 20 grams per 10 minutes, a specific gravity of approximately 0.92 grams per milliliter, a notched Izod impact of approximately 2 foot-pounds per inch, a flexural modulus of approximately 145,000 pounds per square inch, a tensile yield strength of approximately 3,100 pounds per square inch, and/or an elongation at yield of approximately six percent. In some examples, the CPR used has at least one of these properties. In some examples, the CPR used has at least two of these properties. In some examples, the CPR used has at least three, at least four, at least five, or all six of these properties.

CPR having one or more of the foregoing properties can be heated to molten form and then can be injection molded into a mold corresponding to a portion of a play yard or a gate, optionally together with one or more other materials (e.g., non-recycled plastic resin) to form the portion of a play yard or a gate, such as a mesh or lattice of a panel, the frame of a panel or an entire panel.

The CPR is derived from scrapped (e.g., post-consumer) polypropylene material that is washed and extruded.

In some examples, color can be added to the CPR to generate a desired color or color profile for the play yard or the gate.

Figure 3:
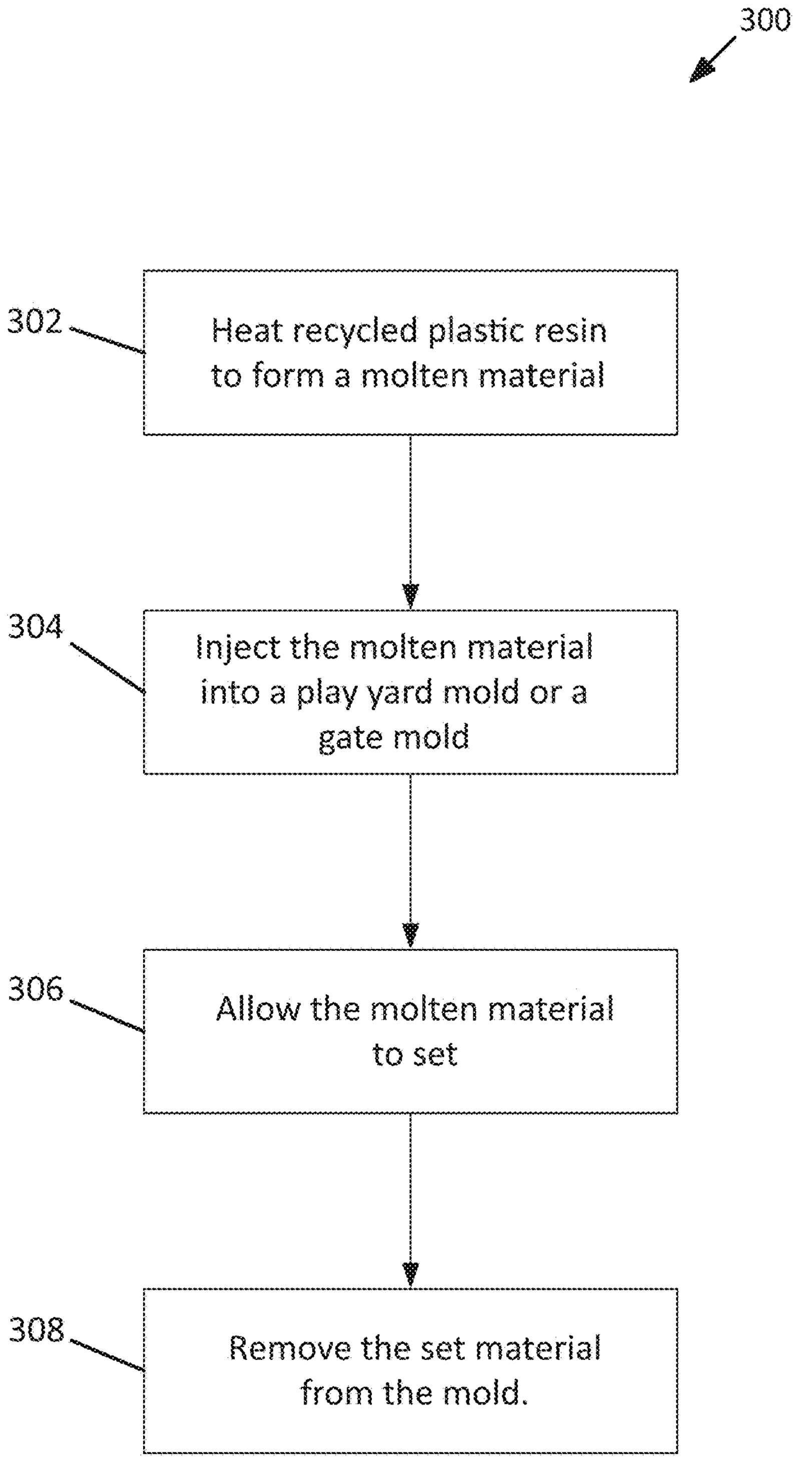
FIG. 3 shows an example method of manufacturing the play yard of FIG. 1 or FIG. 4 or the gate of FIG. 5.

FIG. 3 shows an example method 300 of manufacturing a play yard or a gate in accordance with the present disclosure.

At a step 302 of the method 300, recycled plastic resin is heated to form a molten material. In some examples, the recycled plastic resin is CPR having one or more properties as described herein.

At a step 304 of the method 300, the molten material is injected into a play yard mold or a gate mold configured to generate at least a portion of a play yard or a gate, such as the mesh of a panel, the frame of a panel, or the entirety of a panel.

At a step 306 of the method 300, the molten material is allowed to set in the mold.

At a step 308 of the method 300, the set material in the form of at least a portion of a play yard or a gate is removed from the mold. The molded part can then be incorporated into a play yard or a gate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A play yard or a gate comprising recycled plastic, wherein the recycled plastic consists essentially of recycled copolymer polypropylene resin (CPR) derived from post-consumer polypropylene material that has been washed and extruded.

2. The play yard or gate of claim 1, wherein the recycled CPR has at least one of the following properties:
- (i) a melt flow of approximately 20 grams per 10 minutes;
- (ii) a specific gravity of approximately 0.92 grams per milliliter;
- (iii) a notched Izod impact of approximately 2 foot-pounds per inch;
- (iv) a flexural modulus of approximately 145,000 pounds per square inch;
- (v) a tensile yield strength of approximately 3,100 pounds per square inch; and
- (vi) an elongation at yield of approximately six percent.

3. The play yard or gate of claim 2, wherein the recycled CPR has at least two of the properties.

4. The play yard or gate of claim 2, wherein the recycled CPR has at least three of the properties.

5. The play yard or gate of claim 2, wherein the recycled CPR has at least four of the properties.

6. The play yard or gate of claim 2, wherein the recycled CPR has at least five of the properties.

7. The play yard or gate of claim 2, wherein the recycled CPR has all of the properties.

8. The play yard or gate of claim 7, wherein an entirety of the play yard or the gate is made from the recycled plastic.

9. The play yard or gate of claim 7, wherein a portion of the play yard or the gate is made from the recycled plastic.

10. The play yard or gate of claim 9, wherein the portion is at least one of a frame of a panel and a mesh or lattice of the panel.

11. The play yard of claim 7, wherein the play yard includes a gate.

12. A method of manufacturing a play yard or a gate, comprising:
- heating recycled plastic resin to form a molten material;
- injecting the molten material into a play yard mold or a gate mold;
- allowing the molten material to set into a set material; and
- removing the set material from the play yard mold or the gate mold, wherein the recycled plastic resin consists essentially of recycled copolymer polypropylene resin (CPR) derived from post-consumer polypropylene material that has been washed and extruded.

13. The method of claim 12, wherein the recycled CPR has at least one of the following properties:

(i) a melt flow of approximately 20 grams per 10 minutes;

(ii) a specific gravity of approximately 0.92 grams per milliliter;

(iii) a notched Izod impact of approximately 2 foot-pounds per inch;

(iv) a flexural modulus of approximately 145,000 pounds per square inch;

(v) a tensile yield strength of approximately 3,100 pounds per square inch; and (vi) an elongation at yield of approximately six percent.

14. The method of claim 13, wherein the recycled CPR has at least two of the properties.

15. The method of claim 13, wherein the recycled CPR has at least three of the properties.

16. The method of claim 13, wherein the recycled CPR has at least four of the properties.

17. The method of claim 13, wherein the recycled CPR has at least five of the properties.

18. The method of claim 13, wherein the recycled CPR has all of the properties.

* * * * *